April 18, 1961 H. M. KIECKHEFER 2,979,871
METHOD OF BANDING CARDBOARD CARTONS
Filed Jan. 7, 1957
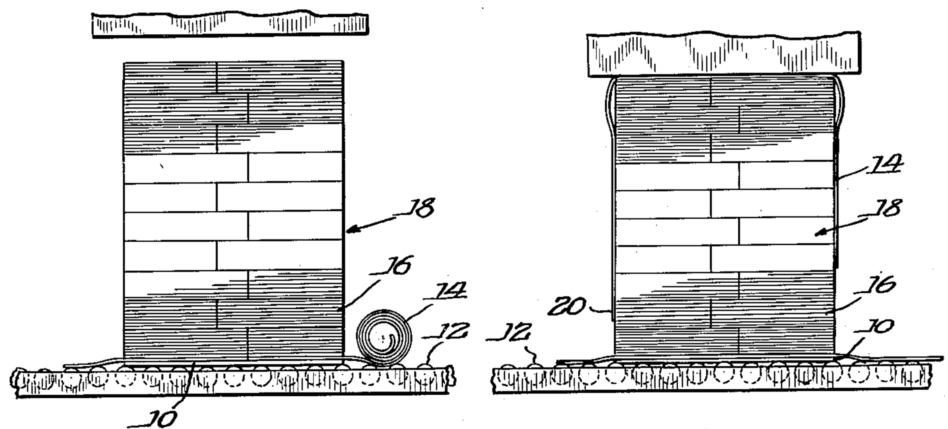
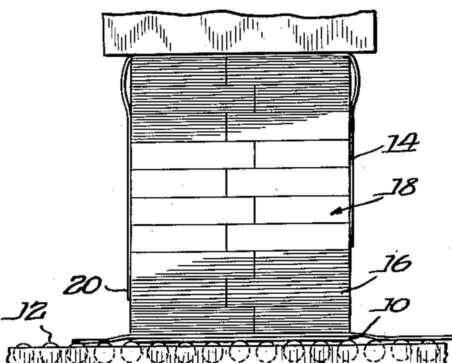
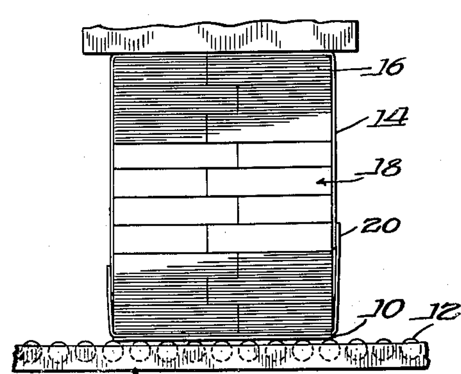
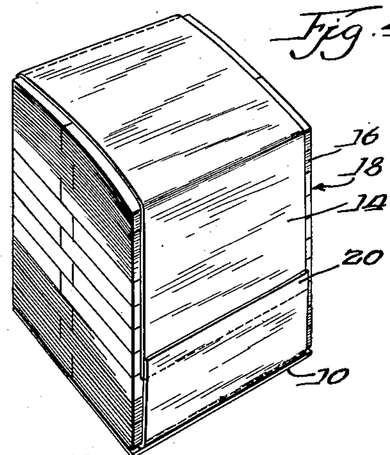
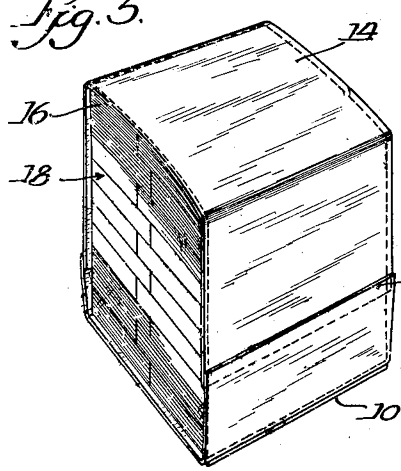
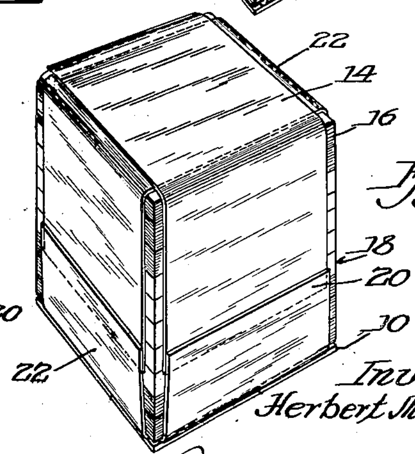
Inventor:
Herbert M. Kieckhefer.
By Merriam & Lorch, Attys.

United States Patent Office 2,979,871

Patented Apr. 18, 1961

2,979,871

METHOD OF BANDING CARDBOARD CARTONS

Herbert M. Kieckhefer, Moorestown, N.J., assignor to Weyerhaeuser Company, Tacoma, Wash., a corporation of Washington Filed Jan. 7, 1957, Ser. No. 632,817

1 Claim. (Cl. 53—3)

This invention relates to a package or bale of stacked collapsed or flattened shipping containers.

Such containers may be formed from a sheet of corrugated containerboard folded into a flattened tube with projecting end flaps and shipped to the user in this flattened or collapsed condition. In shipping such containers the desired number of containers are stacked into a rectangular stack or bale. Heretofore the bale has been compressed and banded with a series of spaced metallic bands, usually at least two to four in number. In order for such a bale to have sufficient rigidity to remain intact during shipment it is necessary to compress the bale substantially with the result that the bands crush or dig into the outermost containers, particularly where the bands contact the corners or edges of the bale. This is due to the inherent resiliency and spring back and the crushable nature of containerboard. Attempts have been made to reduce or eliminate the crushing and spoilage of the outermost containers by placing protective corner pieces or even end and corner pieces at the top and bottom of the bale. Despite this, there is considerable waste because even though protective corner pieces are provided the concentration of the restraining forces in the narrow metallic bands still crushes the outermost containers at the top and bottom of the bales. Furthermore, due to the restraining forces being concentrated along narrow bands, the intervening spaces, that is, portions of the containers between the bands tend to bulge and thus distort the outermost containers particularly at the top of the bale.

According to this invention crushing and mutilation of the outermost containers as well as distortion due to excessive bulging is minimized and practically eliminated. This is accomplished in an economical manner by wrapping the compressed bale with a wide band or wrapper of relatively inexpensive board, such as "containerboard wrapper," the wrapper preferably being at least substantially as wide as the greatest longitudinal dimension of the bale, and then allowing the bale to partially re-expand. Thus, the restraining force, instead of being concentrated along narrow bands, is distributed substantially along the entire horizontal dimensions of the bale of containers. It has been found that at least the same initial compressive forces previously used with metal banding can be used upon the bale without any appreciable damage or mutilation of the outermost containers previously experienced. This is due to the distribution, i.e. spread of these forces over the entire edge or corner by the wide wrapper. Stated somewhat differently, the natural and inherent resiliency of the corrugated containerboard is turned to an advantage rather than it being an insurmountable disadvantage, i.e. causing mutilation and loss of containers. The natural resiliency of the bale of containers of containerboard, when released from initial pressure after being wrapped under compression causes the bale to tend to resume its original dimension and thus tensions the wrapper substantially evenly and not only retains the wrapper in position, but holds the containers in a rigid bale, the wrapper being the sole restraining means for the bale.

A more complete understanding of this invention will be had from the following description when read in connection with the drawings in which:

Fig. 1 illustrates a bale of containers showing the position of the wrapper prior to compression of the bale;

Fig. 2 is a similar view with the bale compressed and the wrapper slit for overlapping and gluing;

Fig. 3 is a similar view with the overlapped ends glued;

Fig. 4 is a perspective view with pressure released illustrating the final wrapped bale;

Fig. 5 is a view similar to Fig. 4 showing a slightly modified wrapper; and

Fig. 6 is a similar view of a still further modified form.

In actual practice this invention has been and may be practiced in the following manner: A protective sheet 10 of corrugated container or fibre board, or a pallet is first placed on a roller conveyor 12 and a wrapping sheet 14 of kraft or other paper, such as liner weighing 42# per thousand sq. ft. is spot glued to the top surface of the protective sheet 10, if one is used. Preferably, the wrapping sheet 14 which obviously may be other than a 42# liner, is at least substantially as wide as the longest dimension of the bale or stack of containers to be wrapped. The containers 16 are then stacked on top of the wrapper and may be arranged for example in a unit or bale 18, formed by "around the horn" or "chimney style" arrangement until the desired number of containers have been stacked. In some instances the bale will be as high or higher than the longest horizontal dimension of the bale in order to obtain the full benefits and all advantages of this invention. For example, bales 48" x 48" x 48" and larger have been found practical. A bale thus prepared is illustrated in Fig. 1. Obviously other stacking arrangements may be employed to take full advantage of the size and shape of the truck or car being filled.

After the desired number of containers have been stacked, usually against a back stop, the stacked bale is moved away from the back stop, used during stacking, and the wrapper is brought upwardly from the bottom, around one side, across the top, and down the opposite side and cut, leaving a sufficient length of wrap to meet the other end of the wrapper as at 20. The thus loosely enclosed bale, that is enclosed on two opposite sides and top and bottom, is then placed under a compression apparatus which engages the top of the bale to substantially compress the latter, but not to the point of crushing the corrugated containerboard. Pressures ranging around 2500# to 3000# overall pressures have been found satisfactory in normal sized bales, although it is to be understood that this pressure is given by way of example only. It has also been found satisfactory to compress a bale approximately 10% of its uncompressed height, although again, this is not critical.

While the bale is thus retained under compression, that side of the wrapper which is continuous and has been caused to bulge by the compression, is slit as shown in Fig. 2 and a quick drying and setting adhesive is applied to one edge and also to one edge of the wrapper on the opposite side and the lapped edges are glued together as shown in Fig. 3. After the adhesive has dried and set, which may take approximately 30 seconds, the pressure is released and the wrapped bale is pushed free and clear of the compression apparatus. Upon release of the pressure the inherently resilient stack of containers springs back approximately 5% of its original dimension and thus places the wrapper under tension sufficient not only to retain the wrapper in position but to restrain the individual containers in the stack against being dislodged, as shown in Fig. 4.

In some instances it has been found advantageous to employ a wrapper which extends beyond the longest dimension of the stacked containers, for example, the wrapper may be 2 inches wider than the largest horizontal dimension of the bale. Such a modification is shown in Fig. 5.

In other instances where the containers were of smaller dimensions, or where it is desired to give protection on all sides of the stacked containers, a second wrapping sheet 22 may be employed to cover the two sides not covered by the first sheet as well as the top and bottom, or separate sheets may be used, one for each of the two sides not covered by the first wrapping. If additional protection is desired on the top and bottom the second sheet may be employed in addition to the one previously mentioned and the second sheet may be slit and wrapped as described in connection with the first sheet. If additional protection is not desired on the top and bottom, but only on the sides not covered by the first sheet, separate sheets may be employed for the opposite sides, that is those sides not covered by the first sheet, in which case these separate sheets would be adhesively secured at their tops and bottoms to the first sheet. These additional sheets, whether they be one or two or more, should all be secured while the stack is under compression. Such a wrapping is illustrated in Fig. 6.

It has been found from practice that in general the same degree of compression may be employed on the stacked containers as was previously employed when narrow metal bands were used as a securing means. However, because of the distribution of the restraining forces over the whole linear edges of the stacked containers rather than being only in narrow band areas, the containers are not only held rigidly but there is no crushing or mutilation of the containers and likewise no distortion of the top outermost containers.

The bottom board provides protection for the wrapper in the event that it is desired to handle the wrapped packages by means of a forked truck. The additional protection by the bottom board makes it possible to insert a chisel fork under the wrapped bales without damage to the surrounding wrapper. Of course, if the wrapped packages are upon raised pallets the ordinary forked truck may be used without likelihood of damage to the packages.

It will be obvious that variations may be made in the details given in the above description without departing from the spirit and scope of this invention as defined in the appended claim.

It is claimed:

The method of protectively wrapping a bale of flattened inherently resilient corrugated shipping containers which consists of stacking said containers in a bale of the desired size; wrapping a paper band around said bale; compressing the wrapped bale substantially but less than that necessary to crush the containers; slitting the band on the side which is continuous; overlapping the ends of the band; gluing the overlapped ends of the band on each side; allowing the glue to set; releasing the bale from compression; and permitting the stacked bale to expand within the limits of the band and tension the latter.

References Cited in the file of this patent

UNITED STATES PATENTS

| | | |
|---|---|---|
| 361,548 | Richards | Apr. 19, 1887 |
| 1,869,127 | Allen | July 26, 1932 |
| 1,913,727 | Shaffer et al. | June 13, 1933 |
| 1,968,172 | Renz | July 3, 1934 |
| 2,132,958 | Martin | Oct. 11, 1938 |
| 2,342,565 | Weeks | Feb. 22, 1944 |
| 2,535,422 | Jones | Dec. 26, 1950 |
| 2,572,584 | Audino | Oct. 23, 1951 |
| 2,578,583 | O'Brien | Dec. 11, 1951 |
| 2,659,187 | Barnes | Nov. 17, 1953 |
| 2,741,361 | Klein | Apr. 10, 1956 |
| 2,751,731 | Evers | June 26, 1956 |
| 2,768,489 | Brown | Oct. 30, 1956 |
| 2,833,403 | Benschoter | May 6, 1958 |